United States Patent
Huang et al.

(10) Patent No.: US 10,059,140 B2
(45) Date of Patent: Aug. 28, 2018

(54) TEMPERATURE INDICATION OR MULTILEVEL ANTI-COUNTERFEIT INDICATION LABEL BASED ON SHAPE MEMORY POLYMER AND TEMPERATURE INDICATION OR MULTILEVEL ANTI-COUNTERFEIT INDICATION METHOD THEREOF

(71) Applicants: Nanjing Tianlang Pharmaceutical Co., Ltd., Nanjing, Jiangsu (CN); Weimin Huang, Jiangsu (CN); Xuelian Wu, Jiangsu (CN)

(72) Inventors: Weimin Huang, Jiangsu (CN); Xuelian Wu, Jiangsu (CN)

(73) Assignee: Nanjing Tianlang Pharmaceutical Co., Ltd., Nanjing, Jiangsu (CN)

( * ) Notice: Subject to any disclaimer, the term of this patent is extended or adjusted under 35 U.S.C. 154(b) by 97 days.

(21) Appl. No.: 14/762,593

(22) PCT Filed: Jan. 20, 2014

(86) PCT No.: PCT/CN2014/070924
§ 371 (c)(1),
(2) Date: Jul. 22, 2015

(87) PCT Pub. No.: WO2014/121689
PCT Pub. Date: Aug. 14, 2014

(65) Prior Publication Data
US 2015/0360499 A1    Dec. 17, 2015

(30) Foreign Application Priority Data
Feb. 5, 2013    (CN) .......................... 2013 1 0045236

(51) Int. Cl.
*B42D 1/00*    (2006.01)
*B42D 19/00*    (2006.01)
(Continued)

(52) U.S. Cl.
CPC ........... *B42D 25/30* (2014.10); *G09F 3/0294* (2013.01)

(58) Field of Classification Search
CPC .......... B42D 1/00; B42D 19/00; B42D 15/00; B42D 15/10; G09C 3/00
(Continued)

(56) References Cited

U.S. PATENT DOCUMENTS

| | | | | |
|---|---|---|---|---|
| 2006/0188706 | A1* | 8/2006 | Kobayashi | B32B 7/12 428/317.1 |
| 2011/0248492 | A1* | 10/2011 | Kittredge | D21H 21/40 283/81 |
| 2015/0292953 | A1* | 10/2015 | Huang | G09F 3/0291 116/216 |

FOREIGN PATENT DOCUMENTS

| | | |
|---|---|---|
| CN | 1587001 | 3/2005 |
| CN | 101877196 | 11/2010 |

(Continued)

OTHER PUBLICATIONS

International Search Report filed in PCT/CN2014/070924 dated May 6, 2014.
(Continued)

*Primary Examiner* — Justin V Lewis
(74) *Attorney, Agent, or Firm* — Rankin, Hill & Clark LLP

(57) ABSTRACT

The present invention relates to temperature detection and indication technology and anti-counterfeit indication technology, and particularly to a temperature indication or multilevel anti-counterfeit indication label and a temperature indication or multilevel anti-counterfeit indication method based on a shape memory polymer. The temperature indication or multilevel anti-counterfeit indication label based on the shape memory polymer includes a matrix of a thermally driven shape memory polymer material, and one
(Continued)

(a)

(b)

or more predeformations are formed on the matrix; the predeformation is formed in one or more stress processes at the same temperature; when multiple predeformations are formed, the sizes of the multiple predeformations are different; and when one predeformation is formed, the geometrical dimension of the predeformation continuously changes along the extension direction of the predeformation.

4 Claims, 2 Drawing Sheets

(51) Int. Cl.
  *B42D 15/00* (2006.01)
  *B42D 25/30* (2014.01)
  *G09F 3/00* (2006.01)
(58) Field of Classification Search
  USPC ............ 281/2, 5; 283/61, 62, 72, 74, 81, 94
  See application file for complete search history.

(56) References Cited

FOREIGN PATENT DOCUMENTS

| CN | 101916528 | | 12/2010 | |
| CN | 102024379 | | 4/2011 | |
| CN | 102706469 | | 10/2012 | |
| CN | 102706469 A | * | 10/2012 | ........... G09F 3/0291 |
| CN | 103137013 | | 6/2013 | |
| WO | 2011060970 | | 5/2011 | |

OTHER PUBLICATIONS

Office action filed in CN Application No. 2013100452362.
U.S. Appl. No. 14/405,703.

* cited by examiner

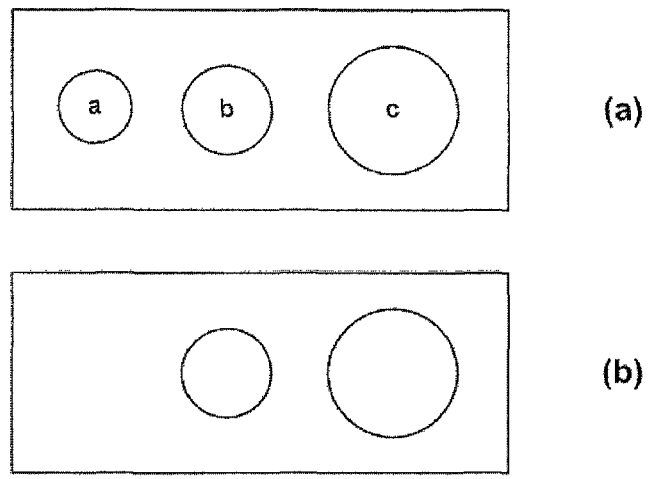
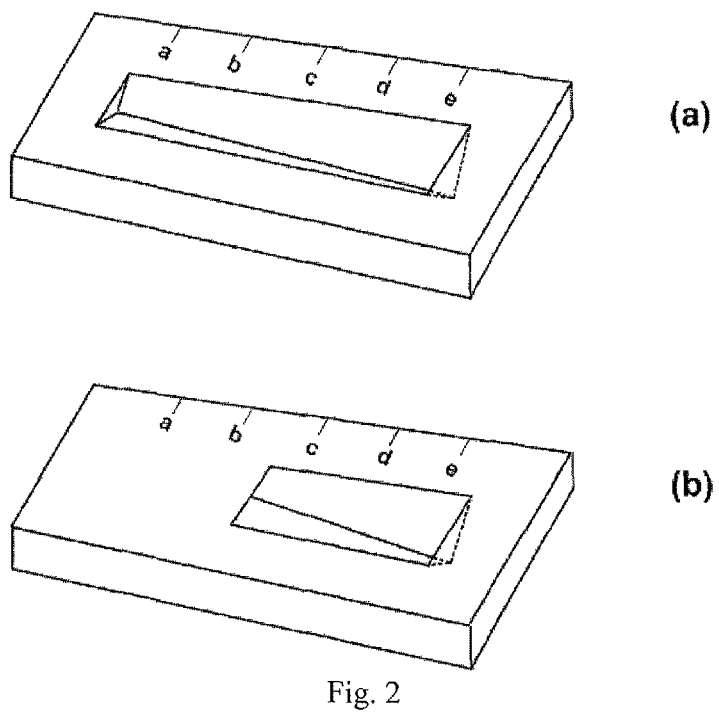
Fig. 2

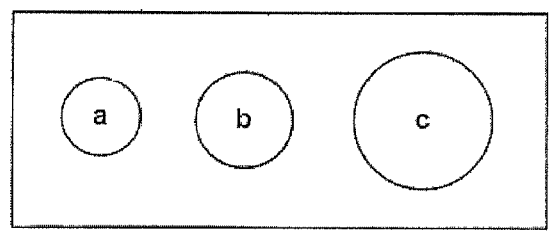
(a)
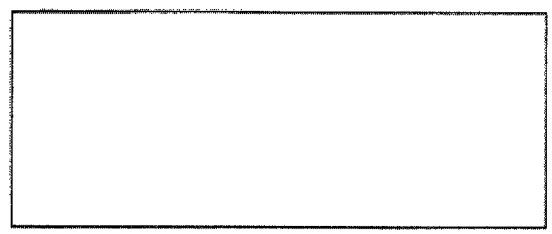
(b)
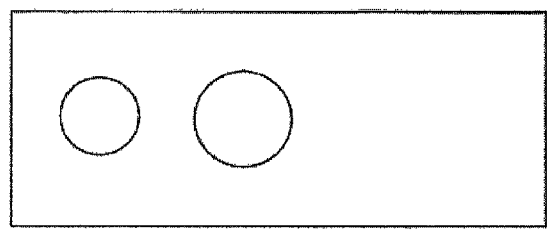
(c)
Fig. 3

TEMPERATURE INDICATION OR MULTILEVEL ANTI-COUNTERFEIT INDICATION LABEL BASED ON SHAPE MEMORY POLYMER AND TEMPERATURE INDICATION OR MULTILEVEL ANTI-COUNTERFEIT INDICATION METHOD THEREOF

FIELD OF THE INVENTION

The present invention relates to a temperature detection and indication technology and an anti-counterfeit indication technology, and particularly to a temperature indication or multilevel anti-counterfeit indication label and a temperature indication or multilevel anti-counterfeit indication method based on a shape memory polymer.

BACKGROUND OF THE INVENTION

In many productions, processing, transportation and storage processes, temperatures, and particularly high temperatures are strictly limited. For example, requirements on the upper limits of temperatures are proposed on the storage and transportation of many drugs in the biomedical field, the storage and transportation of frozen food in the food industry, and constant temperature water bath, constant temperature oil bath and the storage environments of chemical raw materials in the chemical industry. At present, it is not feasible to monitor the temperature of each product in real time in terms of economy and is not completely necessary on practicability. For example, human vaccines are special pharmaceutical products and have strict "cold chain" requirements on transportation and storage, namely each vaccine must be consistently located at a limited low temperature environment in each link of production, storage and issuance, so as to ensure the quality of the vaccine. At present, the incomplete cold chain (for example, vaccines stored in a refrigerator exceed the limited temperature within a certain period of time due to short time power failure) is an important reason resulting in the metamorphism of the human vaccines. The vaccine invalidation resulting from the incomplete cold chain is very difficult to easily identify. The invalid vaccines not only have no epidemic prevention effect on users, but become a kind of injury sometimes, even a fatal threat. Although it is meaningful to monitor the temperature change of each vaccine in real time, from the perspective of economy and technology, the feasibility is very low. The same problem also exists in other industries requiring constant temperature or limited temperature environments, such as frozen food and the like. A simple, reliable, economical and practical method for detecting whether a single product has exceeded the limited maximum temperature and a concrete exceeding value has a very important practical value.

Most of the currently used and reported temperature indication products are based on such technologies as electronic devices, mechanical structures and chemical solutions, etc. Although these technologies are feasible, the application fields are limited, the production processes are complicated and the costs are relatively higher, so that these technologies are very difficult to be applied to the single product.

On the other hand, since more and more traditional anti-counterfeit technologies (for example, laser trademarks, barcodes and patterns and the like) are mastered and copied by the outside world, product counterfeiting has become an increasingly serious social problem. Research and development of new anti-counterfeiting technology have become an urgent need at present.

Many polymer materials have significant shape memory effects, and can sense environment changes and respond to the environment changes in a morphology change (recovering the initial state) manner. At present, thermally driven shape recovery is the most popular driving manner. The principle is to induce the shape recovery via the sensitive properties of the polymers on temperature. Due to the shape memory effects and the low costs, the polymers become a relatively ideal selection of manufacturing cheap temperature indication products in large scales. On the other hand, we can indicate the authenticity of a target article according to the rule of the polymers of gradual morphology change with temperature rise in the shape recovery process.

Patent documents 201210206952.X, 201210480325.5 and 201210512085.2 respectively disclose a temperature indication label and method for temperature indication via a shape memory effect of a shape memory polymer and a multilevel anti-counterfeit indication label and method for anti-counterfeit indication. The basic method is to form multiple predeformations with different recovery temperatures at different temperatures above the initial glass transition temperature or melting transition temperature of the shape memory polymer, so as to form the temperature indication label and method capable of indicating the environment temperature and the multilevel anti-counterfeit indication label and method. Although these products and methods achieve the temperature indication and anti-counterfeit effects, when manufacturing the labels, the multiple predeformation treatments still need to be completed at different temperatures, and the steps are very complicated, which is not conducive to improving the manufacturing efficiency and lowering the cost.

The existing experiments have proved that, for the shape memory polymer, after the predeformation is formed at a certain temperature, the recovery degree of the predeformation is relevant to the predeformation size and the specific heated temperature. In simple terms, specifically, for multiple predeformations with different deformation amounts of a specific shape memory polymer formed at the same temperature, the shape recovery temperature necessary for the predeformation with a smaller deformation amount is lower, while the shape recovery temperature necessary for the predeformation with a larger deformation amount is higher. How to utilize this property of the shape memory polymer to perform temperature indication or multilevel anti-counterfeit indication is involved in no technology currently.

SUMMARY OF THE INVENTION

The technical problem to be solved in the present invention is to provide a temperature indication or multilevel anti-counterfeit indication label based on a shape memory polymer, which is simple in manufacturing steps, high in manufacturing efficiency and low in cost, and a temperature indication or multilevel anti-counterfeit indication method, which is low in implementation cost and high in indication precision.

The temperature indication or multilevel anti-counterfeit indication label based on the shape memory polymer provided by the present invention includes a matrix of a thermally driven shape memory polymer material, and one or more predeformations are formed on the matrix; the predeformation is formed in one or more stress processes at the same temperature; when multiple predeformations are formed, the sizes of the multiple predeformations are different; when one predeformation is formed, the geometrical dimension of the predeformation continuously changes along the extension direction of the predeformation.

When multiple predeformations are formed on the matrix, the geometrical dimension of at least one predeformation continuously changes along the extension direction of the predeformation.

The predeformation is one or the combination of multiple of indentation, projection or flattening deformation.

The temperature indication or multilevel anti-counterfeit indication method based on the shape memory polymer provided by the present invention includes: with a thermally driven shape memory polymer material as a matrix, one or more predeformations are formed on the matrix in one or more stress processes at the same temperature; when multiple predeformations are formed, the sizes of the multiple predeformations are different; when one predeformation is formed, the geometrical dimension of the predeformation continuously changes along the extension direction of the predeformation. This is taken as a temperature indication or anti-counterfeit indication label; thereafter, the recovery condition of the predeformation is observed to judge the maximum temperature once reached by the label or judge the authenticity of an indicated article through the rule of morphology change of the label after being gradually heated. The corresponding relationship of the predeformation recovery condition with the predeformation size and the heating temperature of a particular material can be determined by a test.

Among the multiple predeformations formed on the matrix, the geometrical dimension of at least one predeformation continuously changes along the extension direction of the predeformation.

The shape memory polymer is pre-deformed at a particular temperature to be prepared into the temperature indication or multilevel anti-counterfeit indication label, so that the preparation process can be greatly simplified, the production efficiency can be improved and the manufacturing cost can be lowered; in addition, the predeformation with the continuously changing size is formed at one temperature to improve the sensitivity of the label on temperature change.

BRIEF DESCRIPTION OF THE DRAWINGS

FIG. 1 is a schematic diagram of a temperature label in which predeformations are three independent indentations in the first embodiment of the present invention;

FIG. 2 is a schematic diagram of a temperature label in which predeformation is a strip-shaped indentation groove in the second embodiment of the present invention;

FIG. 3 is a schematic diagram of an anti-counterfeit indication label in which predeformations are three independent projections in the third embodiment of the present invention.

DETAILED DESCRIPTION OF THE EMBODIMENTS

A further detailed illustration of the present invention will be given below with reference to the accompanying drawings and specific embodiments. The protection scope of the present invention is not limited by the specific embodiments and is subjected to the claims. In addition, on the premise of not deviating from the technical solutions of the present invention, any modifications or variations easily made by those of ordinary skill in the art to the present invention shall fall within the scope of the claims of the present invention.

Embodiment 1: A Preparation and Indication Method of a Thermally Driven Shape Memory Polymer Temperature Indication Label a polyurethane material with a size of 10 mm×3 mm×1 mm is used as a matrix, and the glass transition temperature thereof is 30° C. At 20° C., three indentations a, b, c with different deformation sizes as shown in FIG. 1 (a) are respectively pressed on the surface of the matrix, and the shape recovery temperatures corresponding to the indentations are respectively 25° C., 30° C. and 35° C.

The label is placed in the package of a target article or is directly adhered on the surface of the article.

If the surface topography as shown in FIG. 1 (b) appears on the label, it indicates that the indentation a generates shape recovery, and the maximum temperature experienced by the target article is between 25° C. and 30° C.

Embodiment 2: A Preparation and Indication Method of a Thermally Driven Shape Memory Polymer Temperature Indication Label a styrene polymer with a size of 60 mm×25 mm×3 mm is used as a matrix, and the glass transition temperature thereof is 60° C. A long triangular indentation groove as shown in FIG. 2 (a) is pressed at 55° C., and the depth of the indentation groove continuously changes along the extension direction thereof. A, b, c, d, and e are respectively marked on different positions of the indentation groove, and the recovery temperatures corresponding to the positions are respectively 58° C., 59° C., 60° C., 61° C. and 62° C.

The label is placed in the package of a target article or is directly adhered on the surface of the article.

If the surface topography of the label is as shown in FIG. 2 (b), it indicates that the indentations on the a and b positions generate shape recovery, and it can be seen that the maximum temperature experienced by the label is between 59° C. and 60° C.

Embodiment 3: A Preparation and Indication Method of a Thermally Driven Shape Memory Polymer Multilevel Anti-Counterfeit Indication Label an epoxy polymer material with a size of 10 mm×3 mm×1 mm is used as a matrix, and the glass transition temperature thereof is 98° C. In a curing molding process of the matrix, three circular projections a, b, c with different deformation sizes as shown in FIG. 3(a) are formed on the surface. After the matrix is heated to 120° C., all the projections on the surface are flattened to form the predeformation as shown in FIG. 3(b). After being flattened, the recovery temperatures corresponding to the original projections a, b, c are sequentially 90° C., 100° C. and 110° C.

The label is placed in the package of a target article or is directly adhered on the surface of the article.

When needing to verify the authenticity of the article, the label is firstly heated by boiling water, and the morphology as shown in FIG. 3(c) is displayed on the surface of the label; the label is further heated by a lighter, and the label recovers the original morphology as shown in FIG. 3(a). The article can be judged as a genuine article accordingly.

The invention claimed is:

1. A temperature indication or multilevel anti-counterfeit indication label made of a shape memory polymer, comprising a matrix of a shape memory polymer material that changes shape based on temperature, wherein:
   one predeformation is formed on the matrix; the one predeformation is formed in one stress process at a predetermined temperature;
   wherein a depth of the predeformation continuously increases along an extension direction of the predeformation;
   the matrix is configured upon heating to recover towards an initial shape of the matrix that was present before the predeformation was formed therein; and
   an amount of recovery of the matrix towards the initial shape indicates a maximum temperature once reached by the label.

2. The temperature indication or multilevel anti-counterfeit indication label according to claim 1, wherein the one predeformation is an elongate triangular indentation groove.

3. A temperature indication method and a multilevel anti-counterfeit indication method, the method comprising:
   providing a shape memory polymer material as a matrix, wherein the shape memory polymer changes shape based on temperature;
   forming one predeformation on the matrix in one stress process at a predetermined temperature, wherein the one predeformation is formed having a depth that continuously increases along an extension direction of the predeformation, wherein the matrix is configured upon heating to recover towards an initial shape of the matrix that was present before the predeformation was formed therein, and an amount of recovery of the matrix towards the initial shape defines a recovery condition; and
   observing the recovery condition to judge a maximum temperature once reached by the label or to judge authenticity of an indicated article through a rule of morphology change of the label after being heated.

4. The temperature indication method and the multilevel anti-counterfeit indication method according to claim 3, wherein forming the one predeformation includes forming an elongate triangular indentation groove.

* * * * *